United States Patent Office 2,987,513
Patented June 6, 1961

2,987,513
AZO DYESTUFFS AND PROCESS FOR THEIR MANUFACTURE
Karl-Heinz Schmidt, Koln-Flittard, Karl-Heinz Schündehütte and Fritz Suckfüll, Leverkusen, and Horst Nickel, Koln-Stammheim, Germany, assignors to Farbenfabriken Bayer Aktiengesellschaft, Leverkusen, Germany, a corporation of Germany
No Drawing. Filed Dec. 9, 1958, Ser. No. 779,055
Claims priority, application Germany Jan. 31, 1958
7 Claims. (Cl. 260—143)

The present invention relates to new azo dyestuffs and to a process for their manufacture; more particularly it relates to azo dyestuffs of the formula

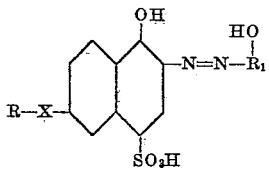

and to the copper complex compounds of said azo dyestuffs.

In the formula X means an azo (—N=N—)

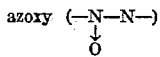

—NH—CO—NH—, —NH.OCCH=CH—CO.NH—
—HN—Cy—NH, Cy being a cyanur-chloride radical, or —HN—Y—NH—, Y being a terephthaloyl radical, R stands for a benzene, naphthalene, azo benzene, azo naphthalene or benzene azo naphthalene residue which is at least substituted by one sulfonic acid or hydroxyl group, and $R_1$ means a coupling component of the benzene, naphthalene, pyrazolone, aceto acetic acid anilide, azo benzene, azo naphthalene and benzene azo naphthalene, said coupling component bearing the OH-group in o-position to the azo bridge.

The new dyestuffs are obtainable by coupling the diazoxide of the formula

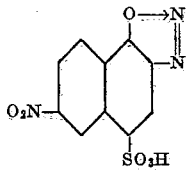

with azo components in the o-position to a group capable of forming metal complexes, by metallising the dyestuffs, if desired, and by converting in the azo dyestuffs or their metal complex compounds thus obtained the nitro-group in the 6-position into a bridge member of the above said structure, containing at least two nitrogen atoms. The metal-free dyestuffs obtainable according to the new process may subsequently be metallised in substance or on the fibre. The metallisation may also be carried out in any other stage of the process.

The process according to the invention leads first to azo dyestuffs of the following general formula

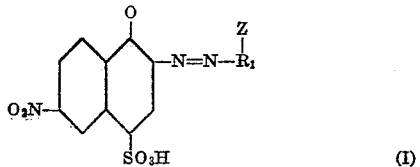

In this formula $R_1$ represents the radical of the said coupling component in which Z is linked in the o-position to the azo bridge, and Z denotes a substituent capable of forming metal complexes, preferably a hydroxyl group. The radical $R_1$ may contain further substituents usual in azo chemistry. Dyestuffs containing a second azo group in the radical $R_1$ are obtainable by coupling the diazo oxide with an azo component $R_1$ containing a diazotizable amino group, said coupling occurring in o-position to the Z substituent and by further diazotising and coupling this compound with an additional azo component, preferably in o-position to a metal complex forming group. By this method further azo groups and metal complex forming groupings can be introduced into the dyestuff molecule. These compounds are also obtainable by coupling the diazo oxide with an azo group containing coupling component $R_1$ in o-position to Z.

The diazoxide to be used is obtainable by a method known as such in a simple manner by reacting the 6-nitro 1,2-naphthoquinone-4-sulfonic acid with arylsulfonic acid hydrazide and by subsequently splitting the hydrazone in an aqueous alkaline medium. In many cases it is not necessary to isolate the diazoxide prior to the following coupling with the azo components. It has, on the contrary, been found that also the reaction mixture from the reaction of quinone with arylsulfonic acid hydrazide which still contains unsplit hydrazone can be used for the coupling reaction with the same result.

Suitable hydroxy compounds coupling in the o-position to a group capable of forming metal complexes are for example hydroxynaphthalenes such as 1-hydroxynaphthalene-4-sulfonic acid, 2-hydroxynaphthalene-3,6-disulfonic acid, 8-ethoxy-1-hydroxynaphthalene-3,6-disulfonic acid, 2-acetylamino-5-hydroxynaphthalene-7-sulfonic acid, hydroxybenzenes, pyrazolones such as 1-(4'-sulfophenyl)-3-methyl-pyrazolone-(5), barbituric acid and the like, acetoacetic acid arylides, heterocyclic coupling components having substituents capable of forming metal complexes in the o-position, azo compounds capable of coupling such as the azo dyestuff from diazotized 2-chloro-1-aminobenzene-5-sulfonic acid and 1,3-dihydroxybenzene.

The reactions for converting the nitro group customary in azo chemistry which are used in this case are the reductive linkage of two nitro group-containing molecules with the formation of an azo or azoxy grouping, the reduction of the nitro group to form an amino group with subsequent diazotising and coupling with azo components, or the reaction of the amino group obtained by reduction with polyfunctional acylating agents in the presence of a second amino component.

For the reaction of the nitroazo compounds which may be present in the form of their metal complex compounds, with reducing agents with a view to linking two molecules via an azo or azoxy grouping there may be used similar or also different nitroazo dyestuffs obtainable according to the invention. The reductive linkage is carried out for example by heating the components in the presence of reducing sugars in an aqueous medium, and it can also be effected with the use of a nitroazo compound obtainable according to the present process and any other aromatic nitro compound.

By reduction of the nitro group in the 6-position in the azo compounds with, for example, sodium sulfide, with subsequent diazotization of the amino compound thus obtained and coupling with azo components, it is possible to build up dyestuffs of the most varied composition. In the case of a reduction of the nitro group with sodium sulfide, the metal complex formation is advantageously carried out at a later stage of the process, since the metal complexes are de-metallised by sodium sulfide.

When coupling the aminoazo compounds obtained by reduction of the nitro group, after diazotizing, with azo (1)

components having a diazotizable amino group, valuable polyazo dyestuffs can likewise be obtained by further diazotizing and renewed coupling. When using o-alkoxyamino compounds of the benzene or naphthalene series as coupling components containing amino groups ($R_2$), and of end components ($R_3$) coupling in the o-position to a hydroxyl or amino group, a further grouping capable of forming metal complexes can be introduced into the dyestuff molecule. Dyestuffs of the general formula

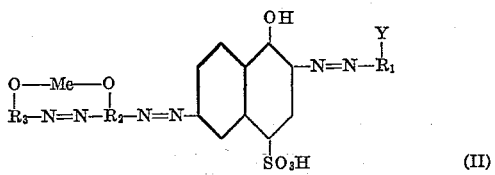

are thus obtained for the manufacture of which the following o-alkoxy-amino compounds of the benzene and naphthalene series ($R_2$) are for example suitable: 1-amino-2-methoxy-benzene, 1-amino-2-methoxy-5-methylbenzene, 1-amino-2,5 - dimethoxybenzene, 1 - amino - 2-methoxynaphthalene-6-sulfonic acid, 1-amino-2-ethoxynaphthalene-6-sulfonic acid. As coupling components ($R_3$) there may be used: 1-hydroxy-4-methylbenzene, 2-hydroxynaphthalene, 2-hydroxynaphthalene-4-, -5-, -6-, -7-, or -8-monosulfonic acid, 2-hydroxynaphthalene-3,6-disulfonic acid, 1-hydroxynaphthalene-4-sulfonic acid, 1-hydroxynaphthalene-3,6- or -3,8-disulfonic acid, 1-hydroxynaphthalene-3,6,8-trisulfonic acid, 1-hydroxy-8-ethoxynaphthalene-3,6-disulfonic acid, 2-acetylamino-5-hydroxynaphthalene-7-sulfonic acid, 1 - phenyl-3-methyl-5-pyrazolone, 1-(4',8'-disulfonaphthyl-[2']-3-methyl-5-pyrazolone.

For the reaction of the amino compounds obtained from the nitro compounds of the Formula I and having the composition

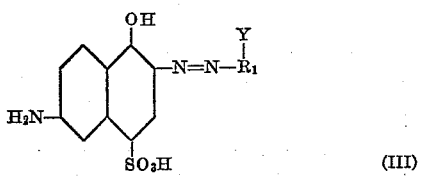

with polyfunctional acylating agents there may be used two similar or also two different radicals containing amino groups. If two different compounds containing amino groups are used, only one has to correspond to the Formula III.

Suitable polyfunctional acylating agents are for example phosgene, fumaric acid dichloride, terephthalic acid dichloride and cyanuric chloride.

The reaction with bifunctional acylating agents is carried out in a manner known as such. The linkage of two radicals containing amino groups in the new dyestuffs via an urea group may also be carried out by reacting the urethane of one amine with another component containing amino groups. In this way compounds are obtainable in a particularly pure form which can also be produced by the reaction of two components containing amino groups with phosgene.

The order of the reaction step required for the manufacture of the new dyestuffs may be widely varied as has already been indicated in some cases. Insofar as metal-free azo dyestuffs are obtained at the end of the process, their metallisation may be carried out in substance or as an after-treatment on the fibre; the conversion of the metal-free dyestuffs or also of the intermediates formed in the course of the process into their metal complex compounds, preferably copper and nickel complexes, is effected by known methods, for example by reaction with copper salts in an aqueous weakly acid solution.

The metal-containing dyestuffs or the dyestuff to be aftertreated with metal salts on the fibre obtainable by the process according to the invention are especially suitable for dyeing fibres of natural or regenerated cellulose. The dyeings are distinguished by good fastness properties, especially very good fastness to light and to wet processing, e.g. to washing.

The following examples are given for the purpose of illustrating the invention.

*Example 1*

30.4 parts by weight (0.1 mol) of 1-hydroxynaphthalene-3,6-disulfonic acid are heated with 29.5 parts by weight of 1-hydroxy-2-diazo-6-nitronaphthalene - 4 - sulfonic acid (0.1 mol) and about 22 parts by weight of calcium oxide in 1400 parts by volume of water to 60–70° C. with stirring for about 30 minutes, a blue dyestuff solution thus being formed.

After completion of the coupling, the product is cooled to room temperature, rendered acid to Congo with hydrochloric acid, and the separation of the dyestuff of Formula IV is completed by means of common salt.

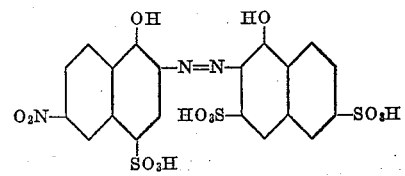

The dyestuff paste is dissolved in 2500 parts by volume of hot water, adjusted to pH 5–6 with sodium acetate and treated with a solution of 25 parts by weight of crystalline copper sulfate. The solution is heated to 90° C. for 15 minutes. After cooling, the coppered dyestuff is separated with common salt, and isolated.

The dyestuff paste is dissolved in 1500 parts by volume of 3% sodium hydroxide solution, treated with 17.5 parts by weight of glucose and kept at 55° C., until the reductive linkage is completed. The dyestuff is isolated as usual. After drying, it is a dark powder which dissolves in water with a blue color and dyes cotton in bluish grey shades.

If in this example 1-hydroxynaphthalene-3,6-disulfonic acid is replaced by one of the following coupling components one obtains dyestuffs which dye cotton in the shades mentioned below:

2-Hydroxynaphthalene-5,7-disulfonic acid _____ blue.
2-Hydroxynaphthalene-3,6-disulfonic acid _____ blue.
2-Hydroxynaphthalene-3,7-disulfonica acid _____ blue.
1-Hydroxynaphthalene-3,8-disulfonic acid _____ blue.
1-Hydroxynaphthalene-4,8-disulfonic acid _____ blue.
1-Hydroxy-8-chloro-naphthalene - 3,6 - disulfonic acid _____ blue.
1-Hydroxy-8-ethoxy-naphthalene - 3,6 - disulfonic acid _____ blue.
1-(4'-Sulfophenyl)-3-methylpyrazolone-(5) _____ violet.
1-(2'-Chloro-4' - sulfophenyl) - 3 - methylpyrazolone-(5) _____ violet.
1-(4',8'-Disulfonaphthyl-[2']) - 3 - methylpyrazolone-(5) _____ violet.

*Example 2*

0.1 mol of 1-hydroxy-2-diazo-6-nitronaphthalene-4-sulfonic acid is coupled with the equivalent amount of 1-hydroxynaphthalene-3,6-disulfonic acid according to the instructions of Example 1. The isolated dyestuff paste is dissolved neutral in 700 parts by volume of warm water, treated with a solution of 41 parts by weight of crystalline sodium sulfide in 100 parts by volume of water and kept at about 55° C., until the reduction of the nitro group to the amino group is completed. The product is isolated with hydrochloric acid and re-dissolved. The paste thus obtained is coppered as usual and converted into the urea by introducing at 30° C. phosgene into the solution which is kept soda-alkaline. The dyestuff is separated out with sodium chloride and isolated. After drying, it is a dark powder which dissolves in water with a bluish violet color and dyes cotton in a violet shade.

If using instead of phosgene cyanuric chloride or fumaric acid dichloride as bifunctional acylating agent, similar dyestuffs are obtained which dye cotton in violet shades.

*Example 3*

If 0.1 mol of the copper complex amino group containing azo dyestuff obtainable according to the instructions of Example 2 and having the composition

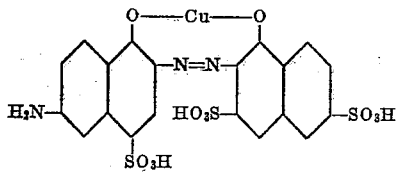

is further diazotized in an acetic acid medium in usual manner, coupled with 1-amino-2-methoxy-5-methylbenzene, diazotized again in an acetic acid medium and coupled with 2-hydroxy-naphthalene-3,6-disulfonic acid, there is obtained, after coppering with de-alkylation, the dyestuff of the formula

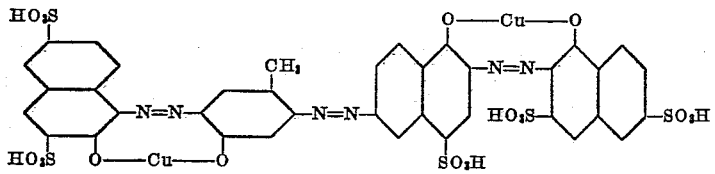

which dissolves in water with a blue color and dyes cotton in bluish grey shades.

*Example 4*

When coupling, as described in Example 1, 0.1 mol of 1-hydroxy-2-diazo-6-nitronaphthalene-4-sulfonic acid with the equivalent amount of 1-(4'-sulfophenyl)-3-methyl-pyrazolone-(5) and converting the monoazo dyestuff thus obtained into the copper complex compound, there is obtained, after reductive linkage by means of glucose in an alkaline medium, a dyestuff which, after drying, is a dark powder dissolving in water with a violet color and dyeing cotton in covered violet shades.

*Example 5*

32.8 parts by weight of the monoazo dyestuff of the formula

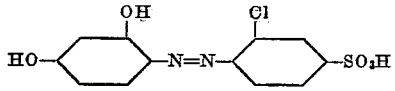

are coupled, similarly to the instructions of Example 1, with 29.5 parts by weight of 1-hydroxy-2-diazo-6-nitronaphthalene-4-sulfonic acid and converted into the copper complex of the following composition:

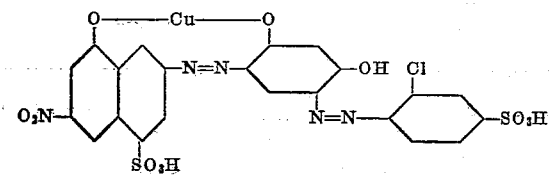

After reductive linkage, a dyestuff is obtained which, after drying, is a dark powder dissolving in water with a brown color and dyeing cotton in brown shades.

*Example 6*

According to the instructions of Example 3, 14.4 parts by weight of 2-hydroxynaphthalene are coupled with the equivalent amount of 1-hydroxy-2-diazo-6-nitronaphthalene-4-sulfonic acid, and the nitromonoazo dyestuff thus obtained is reductively linked with glucose in an alkaline medium.

A dyestuff is obtained of the formula

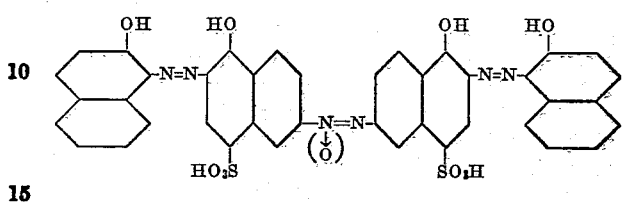

which dyes cotton in blue shades the fastness properties of which can be improved by after-treatment with copper salts.

If instead of 2-hydroxynaphthalene one of the following coupling components is used:

2-hydroxynaphthalene-6-sulfonic acid,
2-hydroxynaphthalene-6-sulfonic acid amide,
1-hydroxy-6-benzoylaminonaphthalene-3-sulfonic acid,
1-hydroxy-6-(3'-carboxy-4'-hydroxyphenyl)-aminonaphthalene-3-sulfonic acid,
1-phenyl-3-methylpyrazolone-(5),
1-phenyl-3-carboxypyrazolone-(5),
1-(2',5'-dichloro-phenyl)-3-methylpyrazolone-(5)

valuable dyeings are obtained on cotton, the fastness properties of which can be improved by after-treatment with copper salts.

*Example 7*

100 parts by weight of cotton are introduced at room temperature into a dyebath containing 4000 parts by volume of water, 2 parts by weight of the dyestuff obtainable according to Example 3, 1 part by weight of sodium carbonate and 20 parts by weight of sodium sulfate. The dyebath is heated to 90° C. within 30 minutes and kept at 90–95° C. for 30 minutes. The cotton is then rinsed and dried. A blue grey dyeing of very good fastness to light is thus obtained.

*Example 8*

29.5 parts by weight (0.1 mol) of 1-hydroxy-2-diazo-6-nitronaphthalene-4-sulfonic acid are heated to 40–50° C. with stirring for 30 minutes with 27.3 parts by weight of 1-chloro-2-amino-5-hydroxynaphthalene-7-sulfonic acid and with about 22 parts by weight of calciumoxide in 500 parts by volume of water. After completion of the coupling the reaction solution is poured into 1000 parts by volume of hot water and rendered acid to Congo with hydrochloric acid. The precipitated dyestuff corresponds to the formula

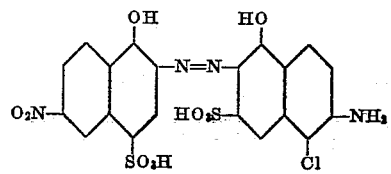

It can be converted into the copper complex compound by the method described in Example 1.

The paste of the copper complex compound is stirred with 1000 parts by volume of water, 40 parts by volume of glacial acetic acid and then diazotized with 18 parts by volume of 30 percent sodium nitrite solution at 0° C. When the diazotization is complete and the soda alkaline solution of 30.4 parts by weight of 2-hydroxynaphthalene-3,6-disulfonic acid in 300 parts by volume of water and 200 parts by volume of 20 percent soda solution are added at 0° C. The dyestuff thus obtained can be reductively linked as described in Example 1 and coppered as usual. One obtains the copper complex of the pentakis azo dyestuff corresponding to the formula

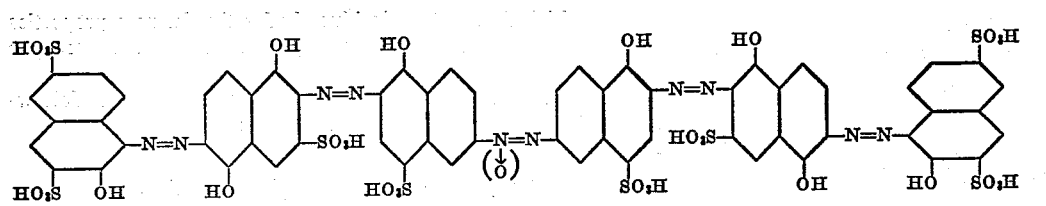

It represents in the dry state a dark powder which dissolves in water with blue coloration and dyes cotton in blue grey shades.

*Example 9*

29.5 parts by weight of 1-hydroxy-2-diazo-6-nitro-naphthalene-4-sulfonic acid (0.1 mol) are coupled as described in Example 1 with the equivalent amount of 1,5-dihydroxynaphthalene-3,7-disulfonic acid. The dyestuff obtained is converted into the copper complex compound and then combined in soda alkaline medium with the diazo salt solution of 0.1 mol of 2-chloro-1-amino-benzene-4-sulfonic acid. The dyestuff thus produced is linked with reduction by means of alkali and glucose, and usually coppered. One obtains the copper complex of the pentakis azo dyestuff having the formula

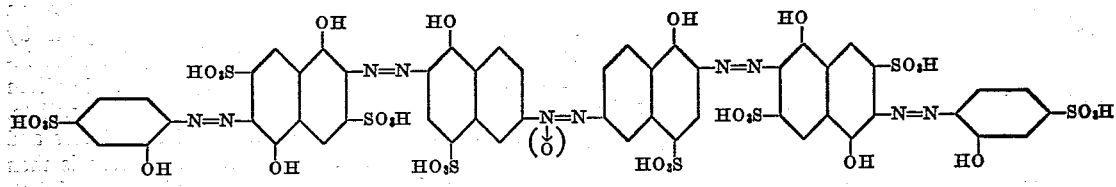

If dried the dyestuff represents a dark powder which dissolves in water with blue coloration and which dyes cotton in greenish grey shades.

We claim:

1. A dyestuff selected from the group consisting of an o,o'-dihydroxy azo dyestuff corresponding to the formula

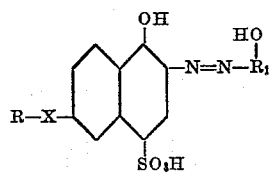

wherein X stands for a member selected from the group consisting of azo and azoxy, R means a radical selected from the group consisting of the naphthalene, azo benzene, azo naphthalene and benzene azo naphthalene series, said radical being substituted by at least one member selected from the group consisting of a sulfonic acid and hydroxyl group and R stands for

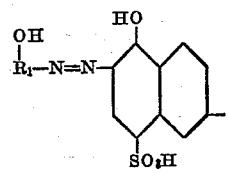

when $R_1$ is a radical of the pyrazolone series, $R_1$ means a coupling component selected from the group consisting of the naphthalene, pyrazolone, azo benzene, azo naphthalene and naphthalene azo benzene series, said coupling component bearing the OH-group in o-position to the azo bridge, and the copper complex compound of said azo dyestuff.

2. A copper containing azo dyestuff corresponding to the formula

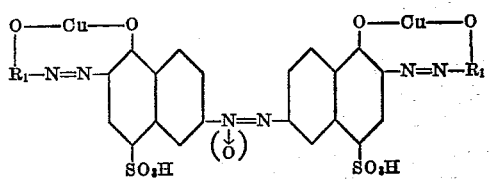

wherein the members $R_1$ are radicals of naphthalene sulfonic acids bearing the complex-linked oxy group in o-position to the azo bridge.

3. A copper containing azo dyestuff corresponding to the formula

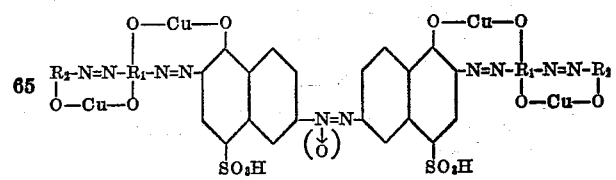

wherein the members $R_1$ and $R_2$ are radicals of naphthalene sulfonic acids bearing the complex-linked oxy groups in o-position each of the azo bridges.

4. The copper containing pentakis azo dyestuff corresponding to the formula

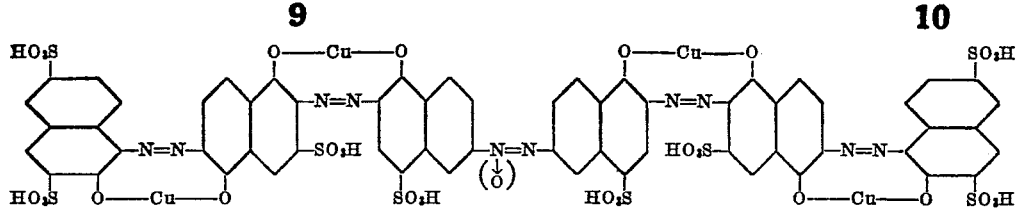
5. The copper containing pentakis azo dyestuff corresponding to the formula
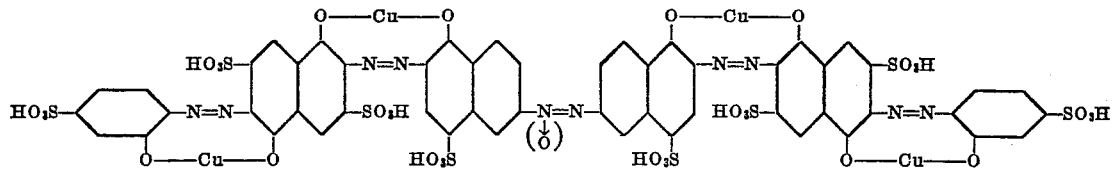
6. The copper containing trisazo dyestuff corresponding to the formula
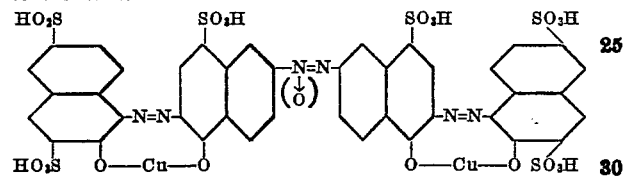
7. The trisazo dyestuff corresponding to the formula
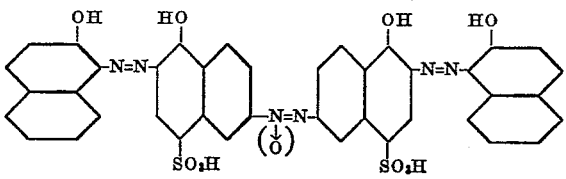
References Cited in the file of this patent
UNITED STATES PATENTS
2,919,269   Nickel et al. _____ Dec. 29, 1959